F. NEUBAUER.
BALL BEARING GEAR.
APPLICATION FILED APR. 20, 1914.
1,164,847.
Patented Dec. 21, 1915.
2 SHEETS—SHEET 1.
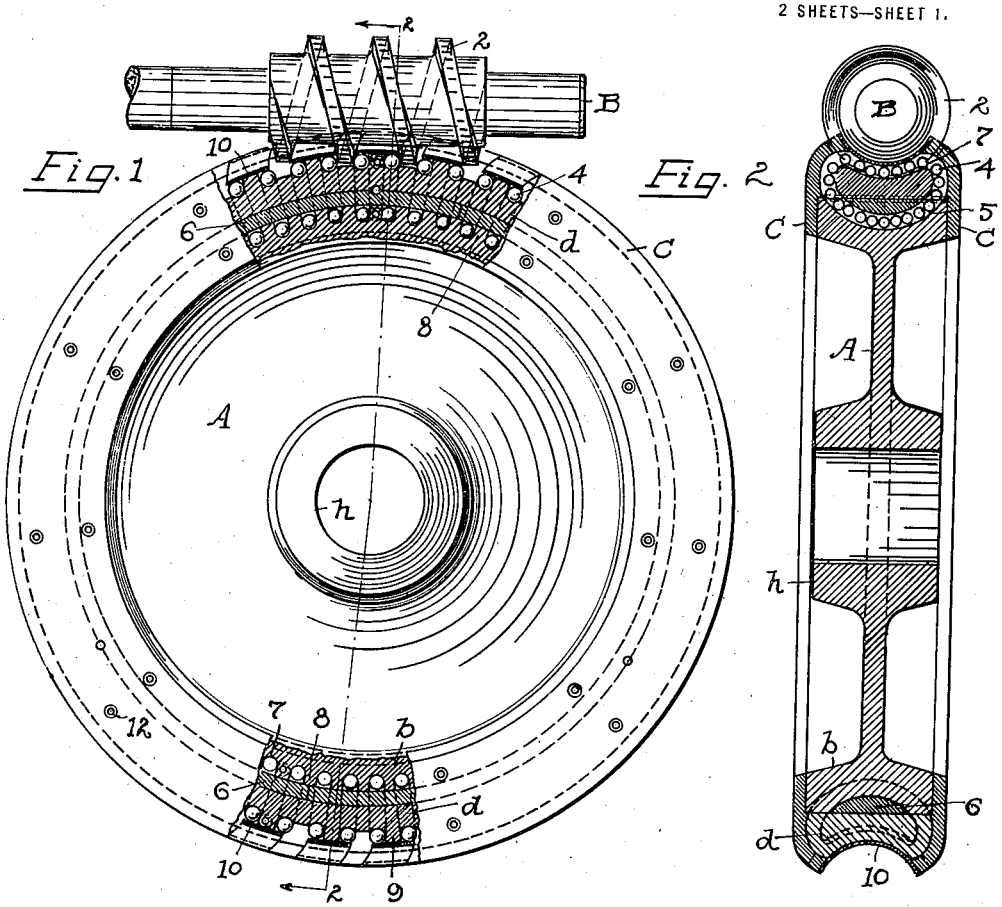
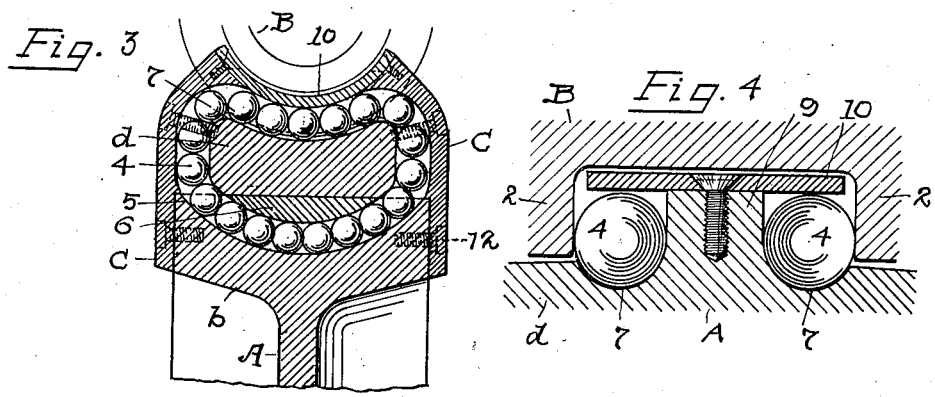
Witnesses.
Inventor.
Ferdinand Neubauer
by
Fisher & Mosst
Atty.

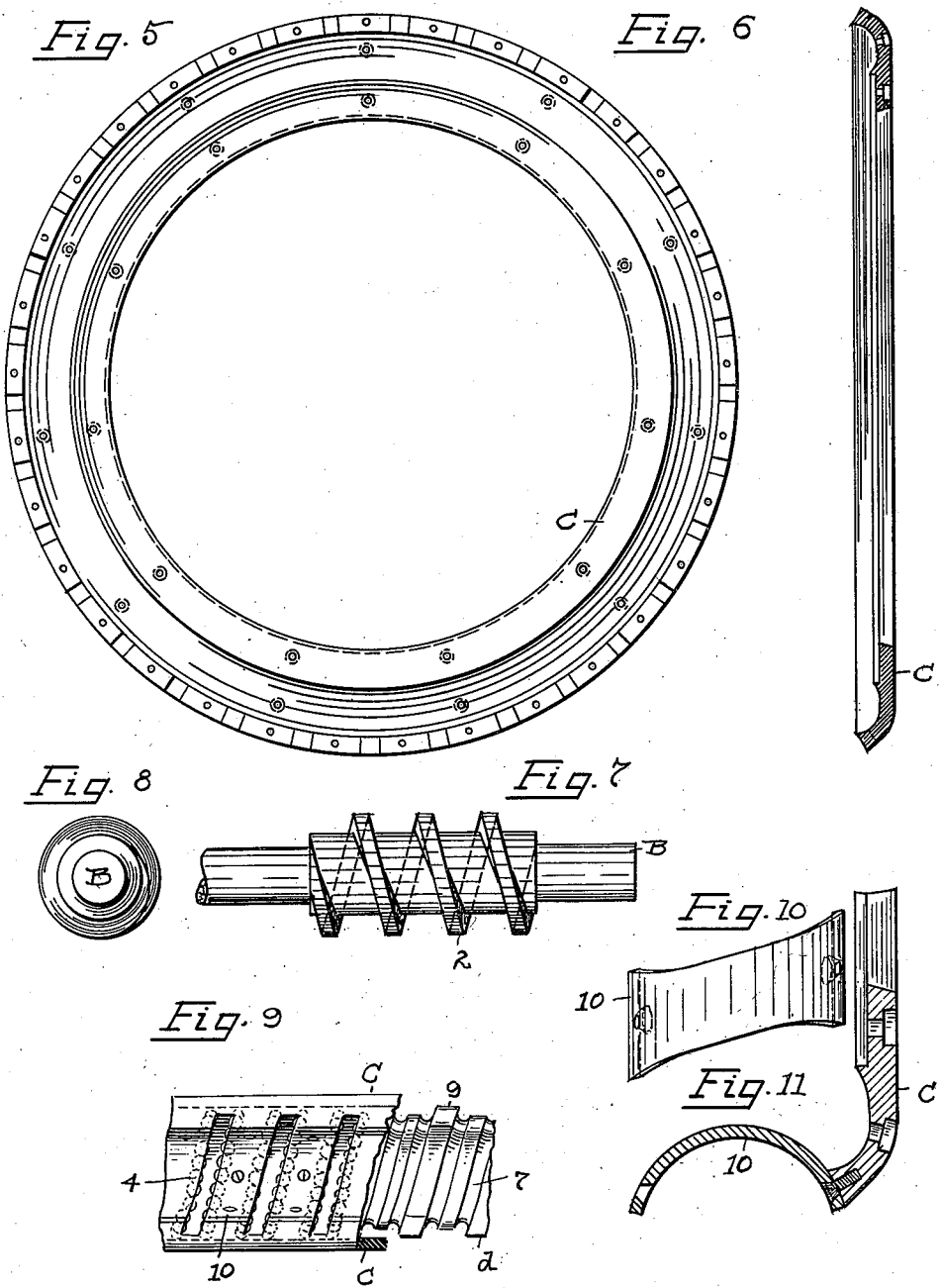

UNITED STATES PATENT OFFICE.

FERDINAND NEUBAUER, OF CLEVELAND, OHIO.

BALL-BEARING GEAR.

1,164,847.

Specification of Letters Patent.  Patented Dec. 21, 1915.

Application filed April 20, 1914. Serial No. 833,299.

*To all whom it may concern:*

Be it known that I, FERDINAND NEUBAUER, citizen of the United States, residing at Cleveland, in the county of Cuyahoga and State of Ohio, have invented certain new and useful Improvements in Ball-Bearing Gears, of which the following is a specification.

This invention relates to ball bearing gears, and the invention as shown herein embraces an annular gear wheel with ball bearings in its meshing portions and a worm gear in mesh therewith through the exposed balls in said bearings, all substantially as shown and described and particularly pointed out in the claims.

In the accompanying drawings, Figure 1 is a side elevation of a wheel adapted to be fixed on a shaft and having an incased ball-bearing gear member and a worm meshed therewith, and Fig. 2 is a sectional elevation of said parts on line 2—2, Fig. 1. Fig. 3 is a cross section of a portion of the said wheel showing the relations of the balls thereto. Fig. 4 is an enlarged cross section of the two intermeshing members, all as hereinafter fully described. Fig. 5, Sheet 2, shows a detail of one of the outer plates of the wheel by which the balls are confined in their races, and Fig. 6 is a cross section thereof. Fig. 7 is a side elevation of the worm member proper, and Fig. 8 is an end view thereof. Fig. 9 is a plan view of a section of the wheel. Fig. 10 is a plan of one of the plates confining the balls on or in the said wheel. and Fig. 11 is a sectional elevation of one of the side plates and a convex ball confining plate attached thereto and serving as seen in the several plates of this kind shown in Fig. 9.

As thus shown, the invention is designed and adapted to reduce friction to the minimum in worm gear connections, and to this end I employ a circular gear wheel A and a worm shaft B with a worm 2 thereon in mesh with antifriction ball bearings or balls 4 mounted and confined in the periphery of said wheel A substantially as seen in several views.

The said wheel has a body indicated by $b$, made in a single piece of casting and provided with a hub $h$ to engage on a shaft and a concave periphery having transverse ball races or channels as seen at 5 successively about the same, the said races or channels being of a depth say about as seen in Fig. 4 and inclined transversely corresponding to the pitch of the worm 2. The complete ball race is shown in cross section Fig. 3, and has ribs 8 between said channels and is built up with said body $b$ as the basic member. A peripheral band 6 encircles the middle of said body and is convex in cross section on its inner side corresponding to the transverse curvature of the said body and the ribs 8 thereon and has a flat outer side forming a seat for the second band $d$, fitting closely thereon. This latter band is heavier than the band 6 and is concave in cross section and has ball channels 7 across its outside surfaces corresponding in lateral pitch or inclination to the worm 2 and the ball channels in the body $b$, and ribs 9 separate the said channels or races 7 in the said outer band $d$, but the said ribs 9 are alternate with two transverse channels or races 7 instead of one for every race as in body $b$, and the said races or channels 7 come on each side of the ribs 9 at the base thereof and the balls therein are covered or overlapped for the most part and confined by means of curved transverse plates 10 affixed by screws to or upon said ribs 9 and overlapping two transverse races and balls at the sides thereof. However, the said balls are exposed at the sides of said channels outside the edges of said plates 10 relatively as seen in Fig. 4, so as to provide engagement for the worm. The said plates 10 are curved lengthwise and serve to confine the balls while the balls themselves are in bearing contact with the worm 2 at the edges thereof.

The side plates C on the body of the wheel, Figs. 5 and 6, are curved inwardly at their outer edges to more or less overlap the balls 4 where they enter from within the sides of said plates into the transverse channels in outer band $d$, and the plates 10 are secured at their ends to the outer edges of these plates as well as to the ribs 9, Fig. 4. The said side plates C are also secured to the body $b$ by screws and to the outer rim $d$ by screws 12.

The balls may be only on one side of the ribs or single instead of double as shown, but the double arrangement is preferred.

It will be understood that the ribs 9 on band $d$ really extend across the edges thereof so as to direct the balls into working relation with the channels in the body A. Of course the wheel as a whole comprises all the essential working parts or portions thereof as seen in Figs. 1, 2 and 3, but its immediate bearing portion consists more especially in the rim *d* affixed thereto through the side plates *c* and having ribs 9 engaged by the balls 4.

The outer band *d* might be made with the band 6 as an integral portion thereof if the body were in two sections to get it in place, but in the present construction said inner band or ring is sectional and band *d* is placed in position from the side of the wheel and locked in place, thus also holding band 6.

What I claim is:

1. A worm gear mechanism comprising a gear wheel having a concave periphery and ball races at an inclination to a direct transverse line in said concave portion, an encircling member about said wheel having races corresponding to those in said wheel and anti-friction balls in said races.

2. The wheel described having a body and band about the same concave in cross section in its periphery and provided with a series of transversely inclined anti-friction ball races encircling the same, the said races being formed in part through the outer portion of said body.

3. A wheel having a series of endless ball races transversely thereof, balls in said races and external plates partially overlapping each separate race of balls to confine the same in the races.

4. A wheel having a series of ball races formed transversely in its periphery and ribs between said races spacing the same apart, the outer portions of said races and ribs being concave in cross section of the wheel, and balls exposed therein, in combination with a worm in working engagement with said balls.

5. A wheel as described having a body with a circumferential channel therein, a band in said channel and said parts together constructed with a series of ball races substantially transversely thereof and ribs intermediate said channels and alternating therewith, and the said races deepest at their center and highest at their outer edge in the periphery of the wheel and balls in said races exposed at the ends of said plates for contact by an engaging member.

In testimony whereof I affix my signature in presence of two witnesses.

FERDINAND NEUBAUER.

Witnesses:
R. B. MOSER,
B. C. TAYLOR.